(No Model.)
E. PFEIFFER.
FURNITURE CASTER.
No. 320,281. Patented June 16, 1885.
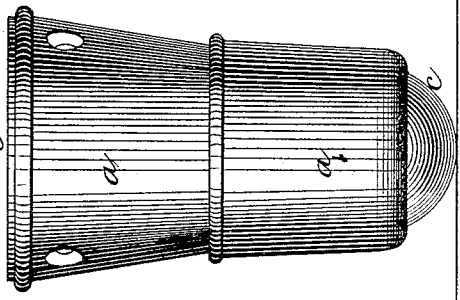
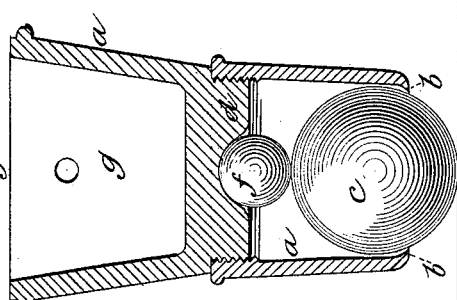
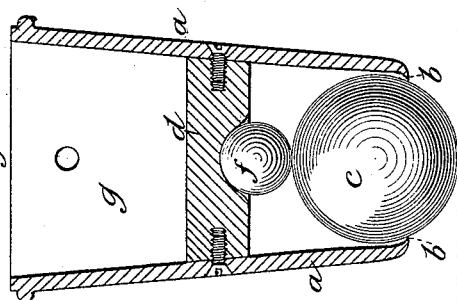
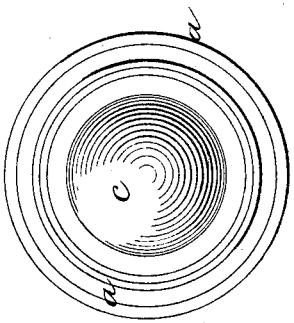
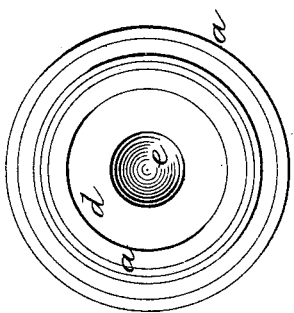
Witnesses.
Percy White
G. DeMotte.
Inventor.
Ernst Pfeiffer
by John J. Halsted & Son
his Attys.

UNITED STATES PATENT OFFICE.

ERNST PFEIFFER, OF LONDON, ENGLAND.

FURNITURE-CASTER.

SPECIFICATION forming part of Letters Patent No. 320,281, dated June 16, 1885.

Application filed June 11, 1884. (No model.) Patented in England January 1, 1884, No. 54, and in Germany January 20, 1884, No. 27,819.

*To all whom it may concern:*

Be it known that I, ERNST PFEIFFER, a subject of the Queen of Great Britain, residing at London, England, have invented new and useful Improvements in Casters for Furniture, also applicable to other friction-reducing purposes, of which the following is a specification.

This invention relates to the construction of an improved ball-caster for furniture of all kinds, applicable also to gates, turn-tables, and the like where it is required to reduce friction between moving surfaces, the object of the invention being to provide a caster which shall have a very small amount of frictional or rubbing surface.

In carrying out my invention I provide a tubular socket or case, in which I place a loose ball of suitable material, the said ball forming the "roller" of the caster. The opening at the bottom of the case or socket is formed with a lip or flange, so that the diameter of the opening is less than the diameter of the ball, whereby the latter is retained within but can partly protrude from the said socket or case. Above the said ball or roller is a plate or its equivalent, in the center of which is a recess of suitable shape, and between the ball or roller and the said recess I place a small ball of suitable material.

In order to enable my invention to be fully understood, I will proceed to describe the same by reference to the accompanying drawings, in which—

Figure 1 is an elevation, and Fig. 2 is a vertical section, of a caster constructed according to my invention; Fig. 3, a plan of the under side of Fig. 1, and Fig. 4 a plan of the under side of the caster, the roller and small ball being removed. Fig. 5 is a vertical section of a caster having the socket or case formed in one piece.

Similar letters in all the figures represent similar parts.

A is the tubular socket or case, which may be formed in two parts, one screwing into the other, as shown in Figs. 1 and 2, or in one piece, as shown in Fig. 5.

*b* is the lip or flange at the opening at the bottom of the case or socket.

*c* is the ball forming the roller, the diameter of the said ball being somewhat larger than the diameter of the opening at the bottom of the caster, so that the ball *c* will be retained within but can partly protrude from the socket or case *a*, as shown.

*d* is the plate above the ball *c*, which plate may form one with the upper part of the case or socket *a* when the same is formed in two parts, as in Figs. 1 and 2, or may be made separate and fixed in the case or socket *a*, as shown in Fig. 5, by screws or equivalent means.

*e* is the recess in the center of the plate *d*, and *f* is the small ball which is placed between the roller *c* and the said recess *e*, the said recess retaining the ball *f* in position.

If a caster of this construction is applied to an article of furniture or otherwise used, the roller-ball *c* will bear against the hereinbefore-described smaller ball, *f*, the points of contact between the ball *c* and the floor or surface on which the caster rests, between the two balls *e* and *f*, and between the smaller ball, *f*, and the recess *e* in which it is placed being the only frictional surfaces in the caster.

The casters may be fixed to articles of furniture, safes, sewing-machines, turn-tables, gates, and the like in any suitable manner—such as by means of a socket, *g*, as shown in the drawings, or by means of a plate or a screw.

Casters of this description, when applied to articles of furniture or otherwise, will allow of the same being easily moved in any direction, the friction of the parts being reduced to a minimum.

The plate *d*, attached inside the case, as described, by screws or other appropriate fastening devices, becomes fixed or non-yielding when so fastened, and the fastenings afford a means of adjusting the plate or of tightening it, as desired, to meet any irregularity of wear in the recess *e* or on the ball *f*, or for any other purpose. This plate may also be turned around and secured in a new position, or it may be vertically changed in position by means of the screws and suitable screw-holes.

In both forms of construction shown the bottom of the socket *g* forms the top of the lower chamber in which the large ball *c* is held. In other words, it alone separates the chambers, and in it only is the central cavity, nearly hemispherical, in which the small friction-ball $f$ lodges. In both forms the large ball is first put into its case, then the small one, and then both are held to place by means either of the recessed upper socket or of the recessed plate.

I claim—

A caster made of a single tube or case, $a$, adapted to receive the ball $c$ at its top, and provided with an inwardly-projecting lip, $b$, at its bottom, combined with a removable internal plate, $d$, having a central cavity on its under face for a single friction ball, $f$, and held to place by screws inserted through the case, the plate serving not only to keep the balls to place, but also to divide the tube into two compartments, as set forth.

ERNST PFEIFFER.

Witnesses:
F. PRICE,
B. BRADY.